May 24, 1938.  F. M. VENZIE  2,118,243

BUILDER'S CLIP

Filed Dec. 19, 1935

INVENTOR
FREDERICK M. VENZIE,
BY
ATTORNEY

Patented May 24, 1938

2,118,243

UNITED STATES PATENT OFFICE 2,118,243

BUILDER'S CLIP

Frederick M. Venzie, Philadelphia, Pa., assignor to Veco Corporation, a corporation of Pennsylvania Application December 19, 1935, Serial No. 55,159

4 Claims. (Cl. 72—118)

This invention relates to builder's clips and, more particularly, to the type of clips that are used by plasterers to connect plaster boards or gypsum blocks forming a part of the interior construction to structural members such as I-beams.

The present invention is a continuation in part of that disclosed in my U. S. Patent Number 1,805,648, dated May 19, 1931, in which has been shown numerous clips capable of performing the same general function as the clip herein described. The principal objection to the use of the clips shown in the patent or other clips of that type is that a large number of differently sized clips are needed since, while the lower flanges of such structural members as I-beams lie in a single plane, the thickness of such flanges vary in accordance with the weight of the beams and the load carried thereby, and the clips must be sized to fit snugly against the flanges.

The present invention provides a clip having the usual means for engaging gypsum blocks or plaster boards but which is provided with a slot which is capable of being enlarged as it is positioned, from a minimum size at which it is manufactured to a predetermined larger size, to engage snugly all flanges sized between a minimum and maximum contemplated.

An object of the present invention is to provide a clip sized as erected to fit any one of a number of supporting members having flanges of different sizes.

Another object of my invention is to provide a clip having a slot for engaging a supporting member which slot may have a portion of the metal forming one side thereof so weakened that it may be enlarged to accommodate supporting members of various sizes.

A further object of my invention is to provide a clip having a slot for engaging a supporting member in which the metal defining said slot may be weakened along one side thereof so that the slot may be enlarged within predetermined limits.

Another and more specific object of my invention is to provide a clip having a slot adapted to engage a supporting member which slot may have a V-shaped opening whereby the clip may be guided onto any one of variously sized flanges of different supporting members and a weakened wall of the slot may be forced to one side sufficiently to allow the flange to enter the slot and be snugly engaged thereby.

Other objects and advantages of the invention will be apparent from the following description, claims and from the drawing in which:

Figure 1:
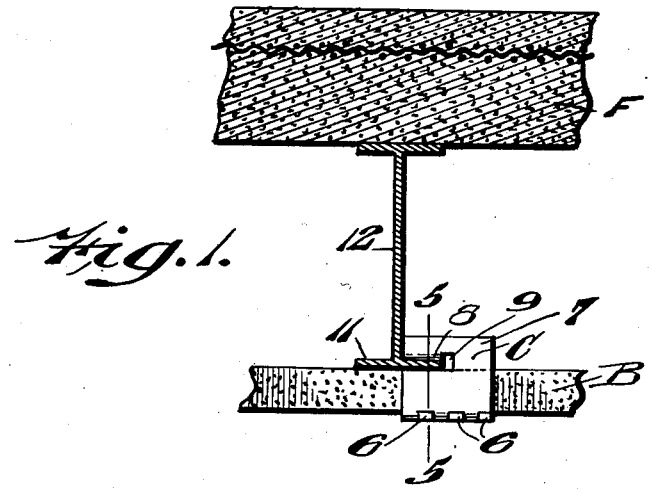
Fig. 1 is a vertical section taken through a ceiling and showing the clip in side elevation.
Figure 2:
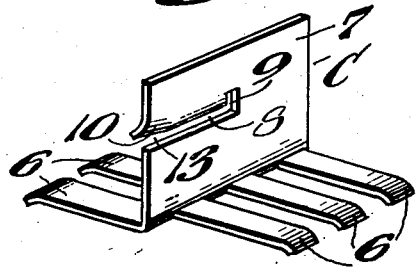
Fig. 2 is a perspective view of the clip embodying my invention.
Figure 3:
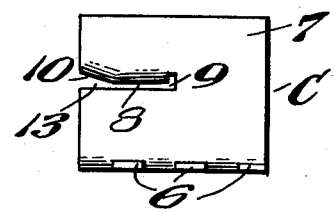
Fig. 3 is an elevation of one side of the clip on an enlarged scale.

Referring now to the drawing in which I have illustrated the preferred embodiment of the invention, the clip C may be stamped from a blank of sheet metal which preferably is rectangular in shape and of greater length than width. On one end of the body portion 7 of the clip C a multiplicity of fingers 6 extend in opposite directions in a plane at right angles to the plane of the body portion 7 of the clip and provide means for supporting a gypsum block B from beneath.

In order to connect the clip to a supporting means, here shown as the flange 11 of an I-beam 12, ordinarily associated with a floor F, a slot 8 is provided. The slot 8 preferably is L-shaped with the upper end of the L connecting with an edge of the body 8 of the clip C that is normal to the plane in which lie the fingers 6. Thus the major axis of the slot lies in a plane parallel to the plane in which lies the fingers and the axis of the toe 9 of the slot is normal to the plane of the fingers and, as shown, the toe may extend away from the plane of the fingers. Preferably, the lower wall of the slot 8 is spaced from the upper surface of the fingers 6 a distance equal to the thickness of the blocks to be supported so that the under surface of the flange 11 will prevent any upward movement of the blocks.

Figures 4, 5:
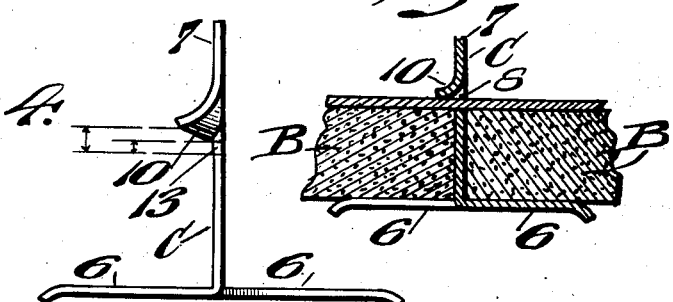
Fig. 4 is an end view of the clip on an enlarged scale.
Fig. 5 is a vertical sectional view of the clip taken on the line 5—5, Fig. 1.

In forming the L-shaped slot 8 no metal is removed but is simply pushed to one side as indicated in Fig. 4. The metal at the outer end of the slot is pushed aside as at 10 a distance, indicated by the longer arrow (Fig. 4), which is equal to the thickness of the thickest flange that it is intended that the clip be associated with. The body proper of the slot is as wide, indicated by the shorter arrow (Fig. 4), as the thickness of the thinnest flange it is intended the clip shall engage.

The toe 9 of the L-shaped slot 8 is provided merely as a means for weakening the body 7 of the clip adjacent the slot a predetermined amount and the length of the toe is therefor equal to the width of the mouth 13 of the slot. Thus the upper wall of the slot, when the clip is forced over a flange which is thicker than the width of the slot as originally formed, may be curled aside until the limit set by the length of the toe is reached.

In using the clips the V-shaped opening 13 of the slot 8 is placed over a flange 11, and, if the flange is thicker than the width of the body of the slot, the clip is hammered, or otherwise forced, into position. This action bends the upper wall of the slot 8 further to one side but only such a distance as will keep the two walls of the slot in snug engagement with the flange.

It is obvious that various modifications may be made in the above described embodiment of my invention without departing from the spirit and scope thereof as set forth in the following claims.

I claim as my invention:

1. A metal clip comprising a body portion, a slot in said body portion, said slot having substantially parallel walls except at the ends thereof, the inner end of said slot being formed with its axis at a right angle to the axis of the slot and the outer end of the slot being as large as the thickness of the thickest element it is intended said clip shall engage.

2. A metal clip comprising means for engaging a member carried by said clip, said means lying substantially in a single plane, a slot with a portion of the metal defining said slot being bent to form a V-shaped opening thereto, and an inner end of said slot being cut with its axis at a right angle to the major axis thereof.

3. A metal clip comprising means for engaging a member carried by said clip, said means lying substantially in a single plane, a slot having its major axis in a plane parallel to the plane of said engaging means, a portion of the metal edge defining said slot being bent to form a V-shaped opening thereto, and an inner end of said slot having its axis at a right angle to the major axis, said end being as long as the widest portion of the V-shaped opening.

4. A metal clip comprising a body portion, an L-shaped slot in said body portion with the end of the longer portion of said slot terminating at an edge of said body portion and the shorter portion of the slot being no longer than the thickness of the thickest element to be engaged thereby, and with the width of the opening in the end of the longer portion of said slot being substantially equal to the length of the shorter portion of the slot.

FREDERICK M. VENZIE.